United States Patent
Procknow et al.

(10) Patent No.: US 11,578,689 B2
(45) Date of Patent: *Feb. 14, 2023

(54) INTERNAL COMBUSTION ENGINE WITH ELECTRIC STARTING SYSTEM

(71) Applicant: BRIGGS & STRATTON, LLC, Wauwatosa, WI (US)

(72) Inventors: David W. Procknow, Elm Grove, WI (US); Mark Meyer, Whitefish Bay, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,526

(22) Filed: Aug. 5, 2021

(65) Prior Publication Data
US 2021/0363955 A1    Nov. 25, 2021

Related U.S. Application Data

(63) Continuation of application No. 16/706,617, filed on Dec. 6, 2019, now Pat. No. 11,085,412, which is a
(Continued)

(51) Int. Cl.
*F02N 11/14* (2006.01)
*A01D 34/68* (2006.01)
(Continued)

(52) U.S. Cl.
CPC .......... *F02N 11/14* (2013.01); *A01D 34/6818* (2013.01); *F02B 63/02* (2013.01);
(Continued)

(58) Field of Classification Search
CPC ...... F02N 15/023; F02N 15/00; F02N 15/006; F02N 15/022; F02N 5/00; F02N 11/00; A01D 34/6818
(Continued)

(56) References Cited

U.S. PATENT DOCUMENTS 1,986,160 A    1/1935  Pomeroy
3,331,363 A    7/1967  Holton, Jr.
(Continued)

FOREIGN PATENT DOCUMENTS

JP    2006-322410    11/2006

OTHER PUBLICATIONS

International Search Report and Written Opinion regarding Appl. No. PCT/US2017/029946, dated Jul. 6, 2017, 7 pages.

*Primary Examiner* — Mahmoud Gimie
(74) *Attorney, Agent, or Firm* — Foley & Lardner LLP

(57) ABSTRACT

An internal combustion engine includes an engine block, a blower housing configured to direct cooling air to the engine block, an electric starting system, and a crankshaft configured to rotate about a crankshaft axis. The electric starting system includes an electric motor and an energy storage device located within the blower housing. The energy storage device is electrically coupled to the electric motor to power the electric motor, and is positioned above the crankshaft. When the starter motor is activated, the electric starting system rotates the crankshaft to rotate the engine for starting.

17 Claims, 10 Drawing Sheets

Related U.S. Application Data continuation of application No. 16/097,044, filed as application No. PCT/US2017/029946 on Apr. 27, 2017, now Pat. No. 10,539,112.

(60) Provisional application No. 62/328,985, filed on Apr. 28, 2016.

(51) Int. Cl.

| | | |
|---|---|---|
| *F02N 15/02* | (2006.01) | |
| *F02B 63/02* | (2006.01) | |
| *F02N 11/00* | (2006.01) | |
| *F02N 15/00* | (2006.01) | |
| *F02N 11/08* | (2006.01) | |

(52) U.S. Cl.
CPC .............. *F02N 11/00* (2013.01); *F02N 15/00* (2013.01); *F02N 15/006* (2013.01); *F02N 15/02* (2013.01); *F02N 15/022* (2013.01); *F02N 15/023* (2013.01); *F02D 2400/06* (2013.01); *F02N 11/0862* (2013.01)

(58) Field of Classification Search
USPC ........................................ 123/179.28, 179.25
See application file for complete search history.

(56) References Cited

U.S. PATENT DOCUMENTS

| | | |
|---|---|---|
| 5,072,627 A | 12/1991 | Horiye et al. |
| 7,370,619 B2 | 5/2008 | Berger |
| 9,140,204 B2 | 9/2015 | Gorenflo et al. |
| 2005/0093685 A1 | 5/2005 | Kachouh et al. |
| 2008/0121489 A1 | 5/2008 | Chevalier |
| 2009/0255502 A1 | 10/2009 | Cook |
| 2010/0269474 A1* | 10/2010 | Hansen .................. A01D 34/81 56/16.7 |
| 2013/0317949 A1 | 11/2013 | Gu et al. |
| 2013/0343906 A1* | 12/2013 | Funke ................. F02N 11/0862 417/10 |
| 2014/0299089 A1 | 10/2014 | Koenen et al. |

* cited by examiner

INTERNAL COMBUSTION ENGINE WITH ELECTRIC STARTING SYSTEM

CROSS-REFERENCE TO RELATED PATENT APPLICATIONS

This application is a continuation of U.S. application Ser. No. 16/706,617, filed Dec. 6, 2019, which is a continuation of U.S. application Ser. No. 16/097,044, filed Oct. 26, 2018, which is a U.S. National Stage Application of PCT/US2017/029946, filed Apr. 27, 2017, which claims the benefit of and priority to U.S. Provisional Patent Application No. 62/328,985, filed Apr. 28, 2016, all of which are incorporated herein by reference in their entireties.

BACKGROUND

The present invention generally relates to internal combustion engines and outdoor power equipment powered by such engines. More specifically, the present invention relates to an electric stating system for an engine.

Outdoor power equipment includes lawn mowers, riding tractors, snow throwers, pressure washers, portable generators, tillers, log splitters, zero-turn radius mowers, walk-behind mowers, riding mowers, industrial vehicles such as forklifts, utility vehicles, etc. Outdoor power equipment may, for example use an internal combustion engine to drive an implement, such as a rotary blade of a lawn mower, a pump of a pressure washer, the auger a snow thrower, the alternator of a generator, and/or a drivetrain of the outdoor power equipment.

Many pieces of outdoor power equipment include engines that are manually started with a recoil starter. To start the engine, the user must manually pull a recoil starter rope. Other pieces of outdoor power equipment include electric starting systems in which a starter motor powered by a battery starts the engine. Conventional electric starting systems typically require an engine block different than the engine block used with a recoil starting system. The electric start engine block adds a mounting location that the starter motor is secured to.

SUMMARY

One embodiment of the invention relates to an internal combustion engine including an engine block, a blower housing configured to direct cooling air to the engine block, an electric starting system, and a crankshaft configured to rotate about a crankshaft axis. The electric starting system includes an electric motor and an energy storage device located within the blower housing, wherein the energy storage device is electrically coupled to the electric motor to power the electric motor. The energy storage device is positioned above the crankshaft. When the electric starting system is activated, the electric starting system rotates the crankshaft to rotate the engine for starting.

Another embodiment of the invention relates to an electric starting system for an internal combustion engine including an electric motor and a rechargeable lithium-ion battery located within a blower housing of the internal combustion engine. The rechargeable lithium-ion battery is electrically coupled to the electric motor to power the electric motor. When the electric starting system is activated, the electric starting system rotates a crankshaft of the internal combustion engine to rotate the engine for starting. The rechargeable lithium-ion battery is positioned above the crankshaft.

Another embodiment of the invention relates outdoor power equipment including an internal combustion engine. The internal combustion engine includes an engine block, a blower housing, an electric starting system, and a crankshaft configured to rotate about a crankshaft axis. When the electric starting system is activated, the electric starting system rotates the crankshaft to rotate the engine for starting. The electric starting system includes a battery that is positioned within the blower housing, above the crankshaft.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
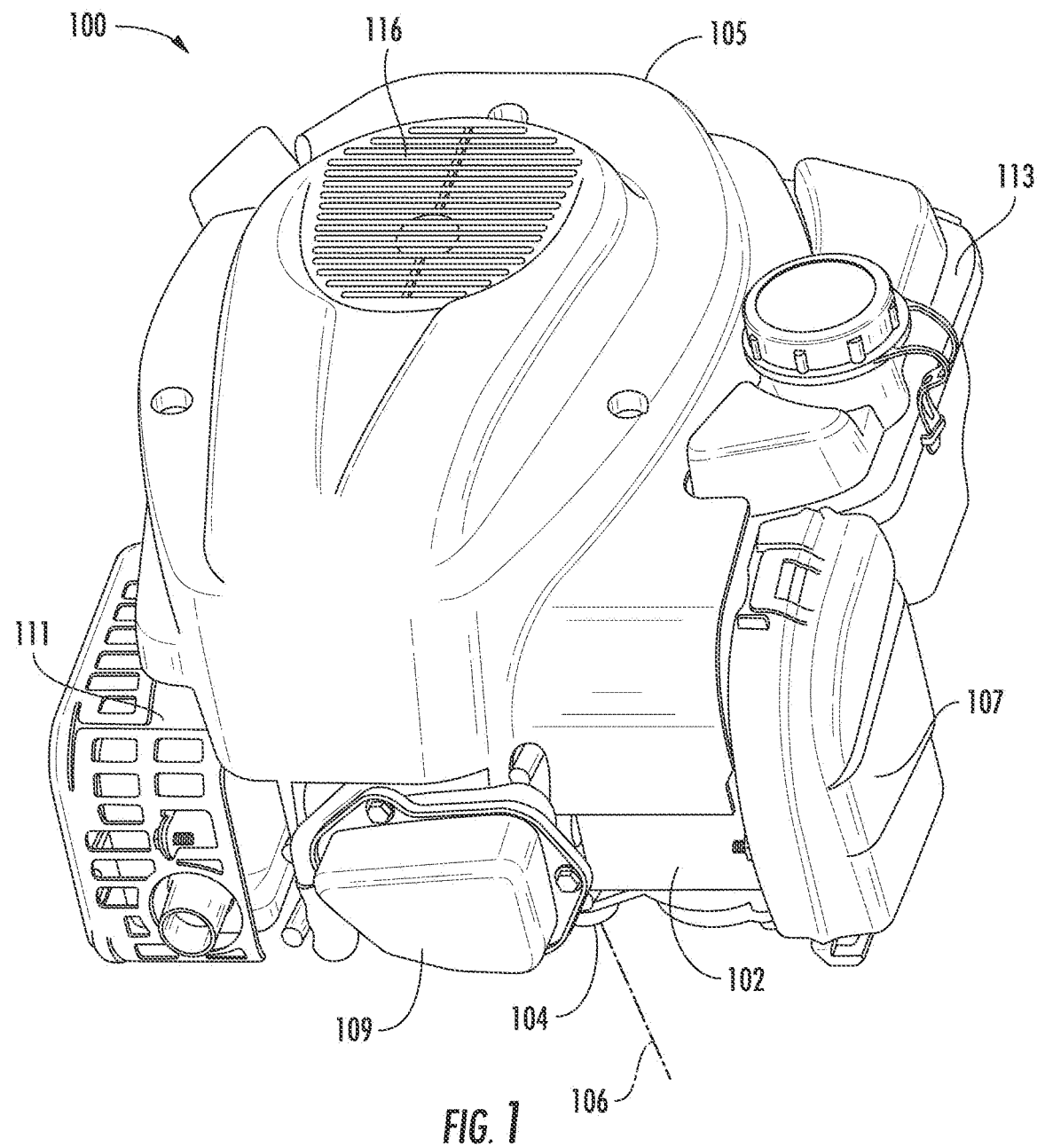
FIG. 1 is a perspective view of an internal combustion engine including an electric starting system, according to an exemplary embodiment.
Figure 2:
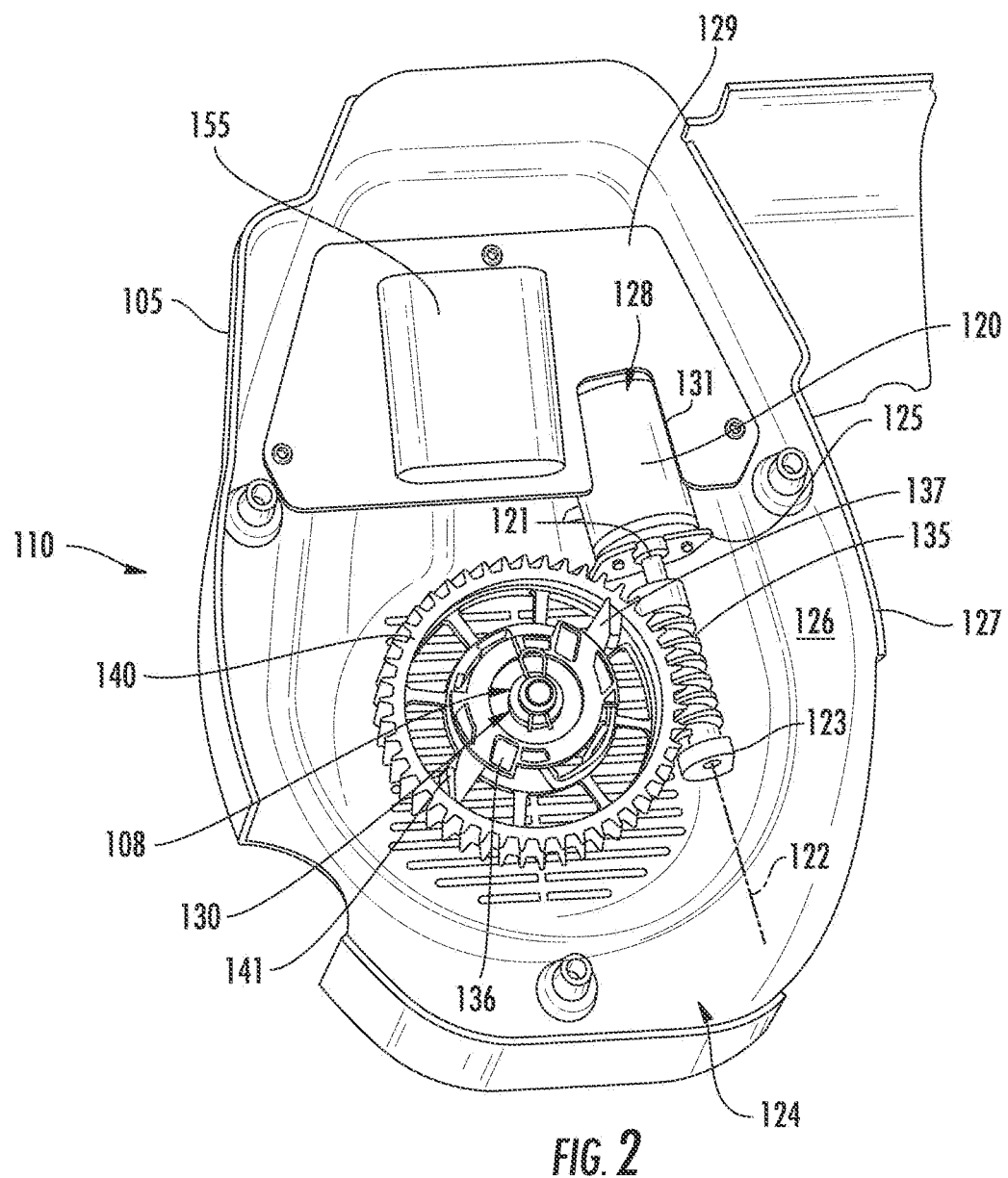
FIG. 2 is a bottom perspective view of a portion of the engine of FIG. 1.
Figure 3:
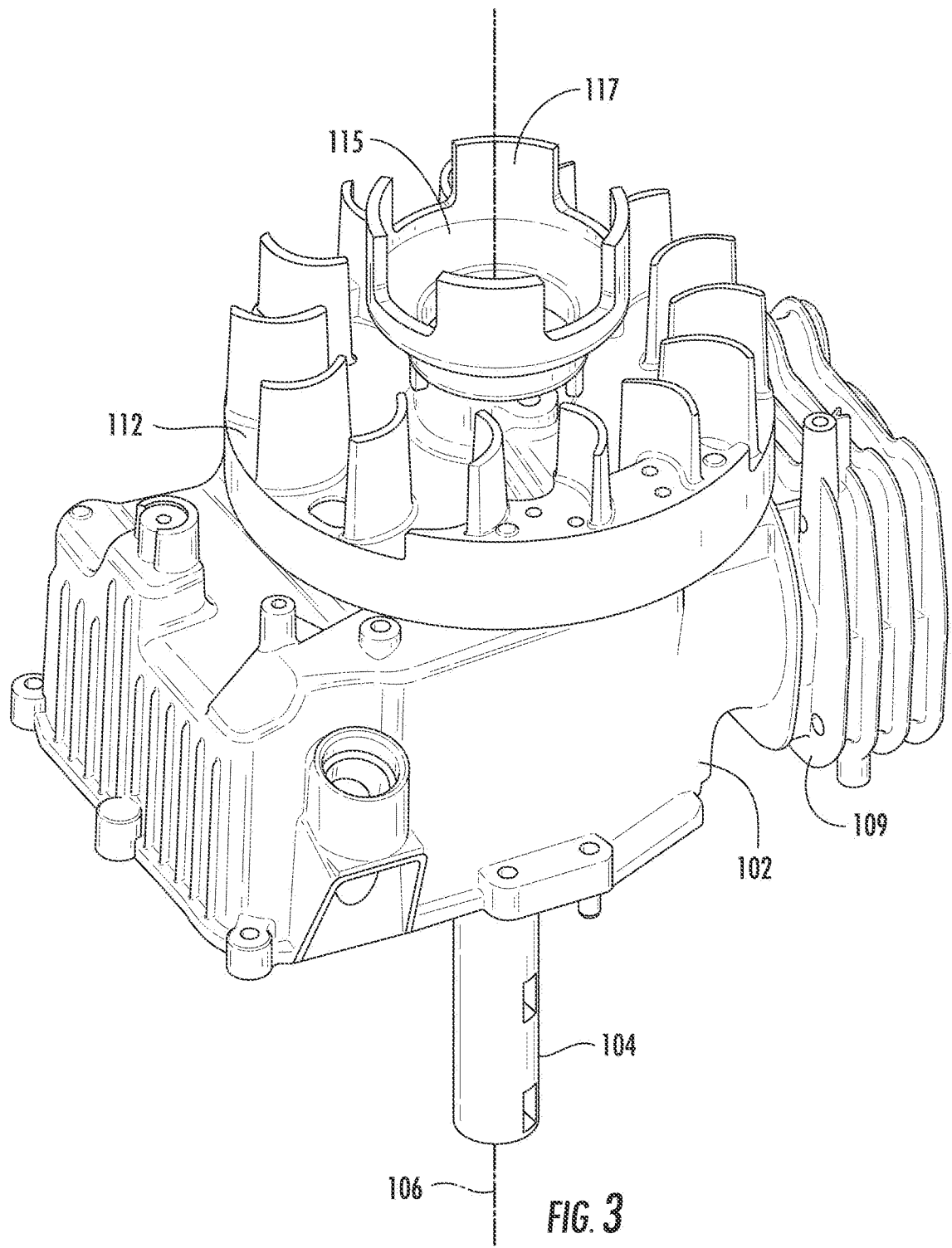
FIG. 3 is a perspective view of a portion of the engine of FIG. 1, according to an exemplary embodiment.

Referring to FIGS. 1-3, an internal combustion engine 100 including an electric starting system 110 is shown according to an exemplary embodiment. The internal combustion engine 100 includes an engine block 102 having a cylinder, a piston, and a crankshaft 104. The piston reciprocates in the cylinder to drive the crankshaft 104. The crankshaft 104 rotates about a crankshaft axis 106. A flywheel 112 (FIG. 3) is attached to the crankshaft 104. The engine 100 also includes a fuel system for supplying an air-fuel mixture to the cylinder (e.g., a carburetor, an electronic fuel injection system, a direct fuel injection system, etc.), an air filter assembly 107, a cylinder head 109, a muffler 111, and a fuel tank 113. The engine 100 also includes a blower housing 105 (cowl, cover) configured to direct cooling air over the engine block 102 and other components of the engine during engine operation. A fan (e.g., a fan driven by the crankshaft 104, an electric fan, etc.) draws cooling air from the ambient environment into the blower housing 105 through one or more air inlets 116. The fan may be a component of or coupled to the flywheel 112. In the illustrated embodiment, the crankshaft 104 and the crankshaft axis 106 are oriented vertically. In some embodiments, the crankshaft 104 and the crankshaft axis 106 are oriented horizontally. In some embodiments, the engine includes multiple cylinders, for example, a two cylinder engine arranged in a V-twin configuration.

Figure 6:
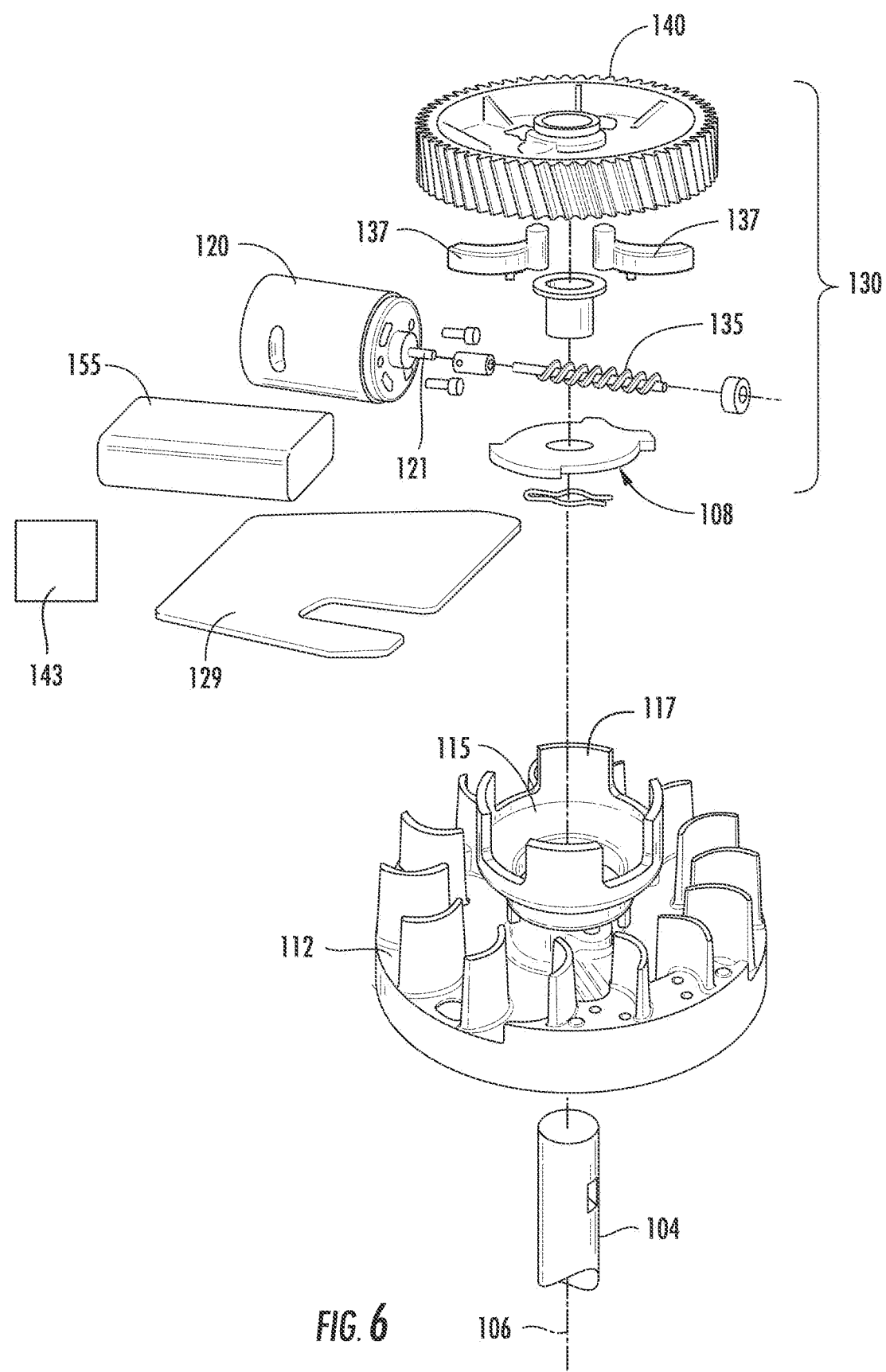
FIG. 6 is an exploded view of several components the engine of FIG. 1.

Referring to FIGS. 2 and 6, the electric starting system 110 includes an electric motor 120, a transmission 130, and an energy storage device such as a battery 155 (e.g., a lithium-ion battery, a capacitor, multiple batteries or capacitors, or other suitable energy storage devices). The electric starting system 110 is located within the blower housing 105. The electric motor 120 is electrically coupled to the battery 155 to be powered by the battery 155. In one embodiment, the electric motor 120 is a 12 volt (V) electric motor. In another embodiment, the electric motor 120 is a 7.2 V electric motor. In other embodiments, the electric motor 120 may be otherwise rated. The battery 155 may include one or more battery cells (e.g., lithium-ion cells). In some embodiments, the battery 155 may be further configured to power other systems of the engine 100, such as an electronic control having control circuitry coupled to sensors or detectors integrated with the engine 100 (e.g., brake release, fuel-level detector, ignition-fouling detector, governor, vacuum sensors, pressure sensors, temperature sensors, etc.). When activated in a response to a user input (e.g., via a key switch, a push button, a bail start system, a trigger start system for a pressure washer, other automatic start system, etc.), the electric starting system 110 rotates the crankshaft 104 to enable starting of the engine 100.

The transmission 130 includes a worm 135 coupled to the electric motor 120, a worm gear 140 engaged with the worm 135, a clutch 108, and a flywheel 112 including a flywheel cup 115. Referring to FIG. 3, the flywheel 112 is attached to the crankshaft 104 and includes a flywheel cup 115 with one or more flywheel protrusions 117. The flywheel cup 115 rotates with the flywheel 112. As such, the flywheel cup 115 and flywheel protrusions 117 rotate with the rotation of the crankshaft 104 about a crankshaft axis 106 upon rotation (e.g., cranking) of the engine 100. In some other embodiments, the flywheel 112 includes flywheel protrusions 117 attached directly thereto without including the flywheel cup described above.

The electric motor 120 is fastened to a mounting bracket 125 (e.g., by screws, bolts, rivets, or other appropriate fasteners). The underside 124 of the blower housing 105 includes an outer or boundary portion 126 defined by one or more sidewalls 127. The electric motor 120 is positioned within a recess 128 formed in the underside 124 of the blower housing 105. A mounting plate 129 is fastened to the underside 124 of the blower housing 105 (e.g., by screws, bolts, rivets, or other appropriate fasteners) to hold the battery 155. The mounting plate 129 includes a cutout 131 that accommodates the electric motor 120. One end of the worm 135 is coupled to the electric motor's output shaft 121 and rotates about a worm axis 122. The opposite end of the worm 135 is supported by a bearing 123. The bearing 123 is attached to or a component of the blower housing 105 and is located on the underside 124 of the blower housing 105. The battery 155 is located between the blower housing 105 and the mounting plate 129. In some embodiments, the battery 155 is fastened to the underside 124 of the blower housing (e.g., by screws, bolts, rivets, or other appropriate fasteners). In some embodiments, the battery 155 is fastened to the mounting plate 129 (e.g., by screws, bolts, rivets, or other appropriate fasteners). In other embodiments, the battery 155 is positioned on the topside of the blower housing 105 (shown in FIG. 9).

Figure 4:
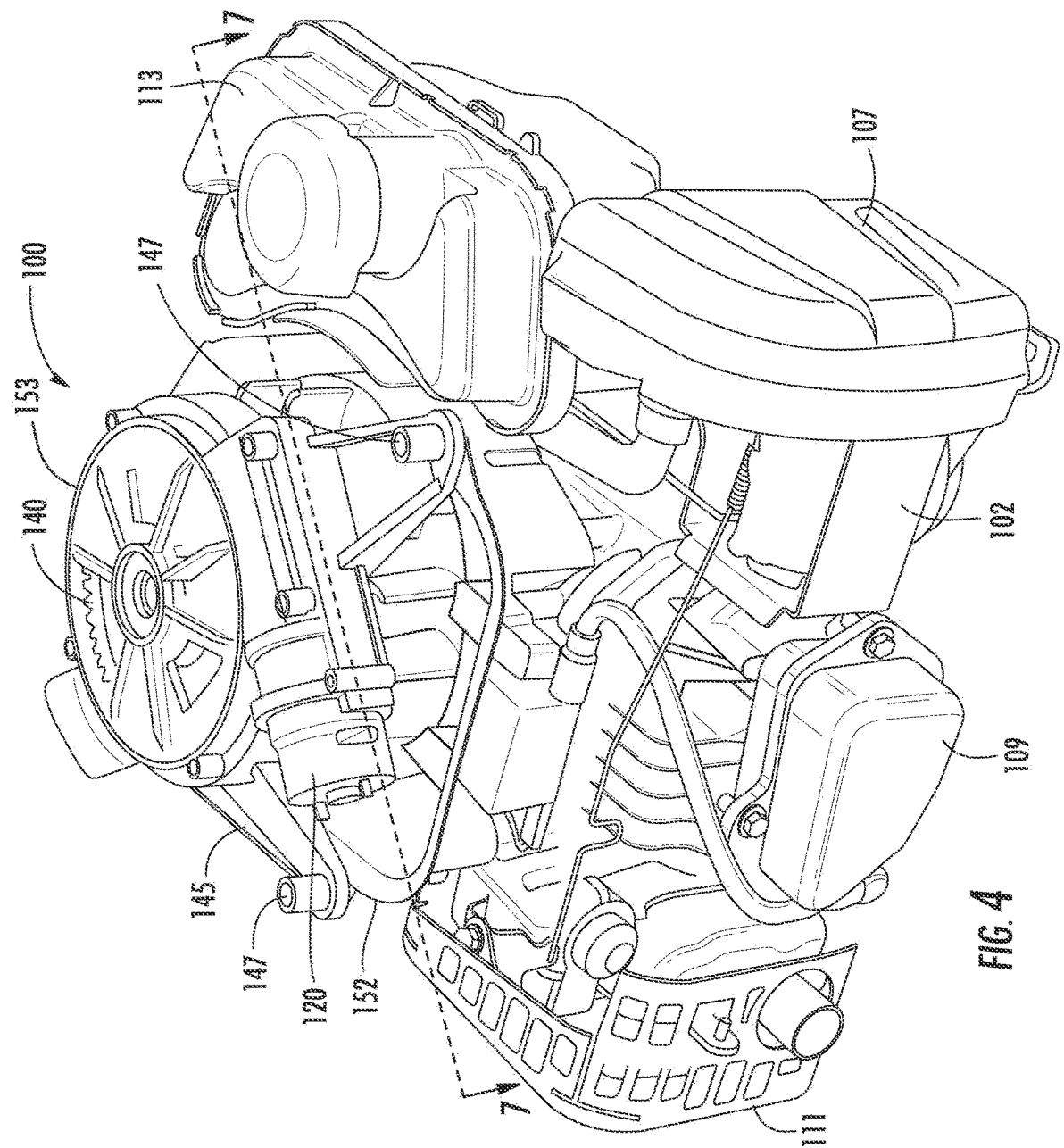
FIG. 4 is a perspective view the engine of FIG. 1 with the blower housing removed, according to an exemplary embodiment.
Figure 5:
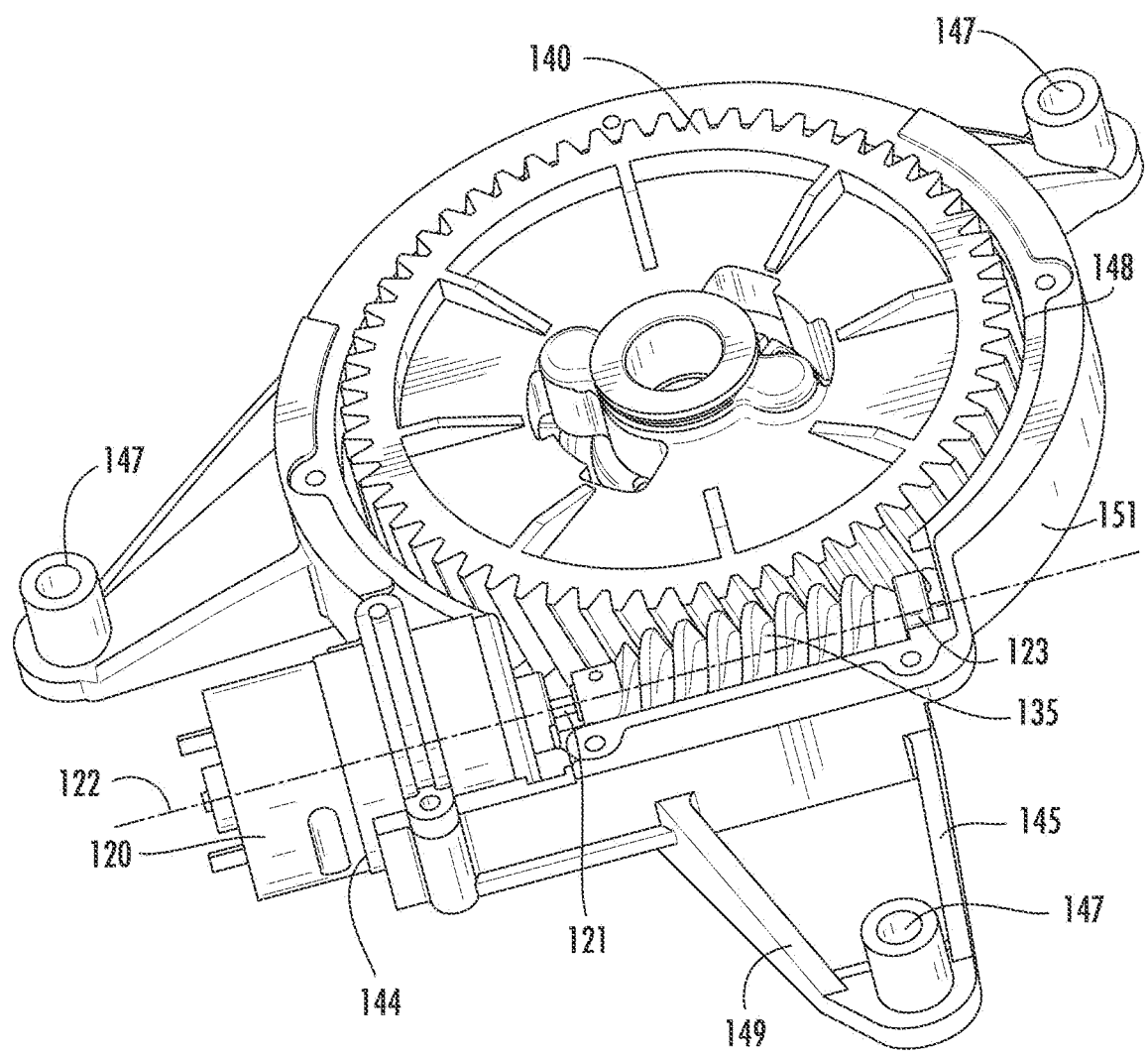
FIG. 5 is a perspective view of a portion of the engine of FIG. 1, according to an exemplary embodiment.

As shown in FIGS. 4-5, in some embodiments, a mounting frame 145 is fastened to a portion of the engine 100 (e.g., blower scroll 152) via apertures 147 (e.g., by screws, bolts, rivets, or other appropriate fasteners). The mounting frame 145 includes a center portion 151 with one or more legs 149 branching therefrom. The center portion 151 includes an aperture 148 within which the worm gear 140 is positioned. The mounting frame 145 further includes a cutout 144 that accommodates the worm gear 140 and electric motor 120. As discussed above, one end of the worm 135 is coupled to the electric motor's output shaft 121 and rotates about a worm axis 122. The opposite end of the worm 135 is supported by a bearing 123. The bearing 123 is attached to or a component of the mounting frame 145. As shown in FIG. 4, in some arrangements, a cover 153 may be fastened onto the mounting frame 145 to house the worm gear 140 and worm 135. The blower housing 105 can be mounted onto the engine 100 on top of and covering the mounting frame 145. Accordingly, supporting the worm gear 140, worm 135, and electric motor 120 on the mounting frame 145 and not on the blower housing 105 allows an operator and/or an original equipment manufacturer (OEM) to readily exchange blower housings (e.g., to differently accessorize, customize) for different customers.

The worm gear 140 is configured to rotate about the crankshaft axis 106 and selectively drive the crankshaft 104 via the clutch 108 (e.g., a starter clutch, a freewheeling clutch, an overrunning clutch, and overspeed clutch, etc.). The clutch 108 is coupled to worm gear 140. When the clutch 108 is engaged (in an engaged position) the worm gear 140 and the crankshaft 104 rotate together. When the clutch 108 is disengaged (in a disengaged position) the worm gear 140 and the crankshaft 104 are free to rotate independently of one another. The crankshaft axis 106 is perpendicular to the worm axis 122. In other embodiments, the worm axis 122 is otherwise angled relative to the crankshaft axis 106.

Figure 7:
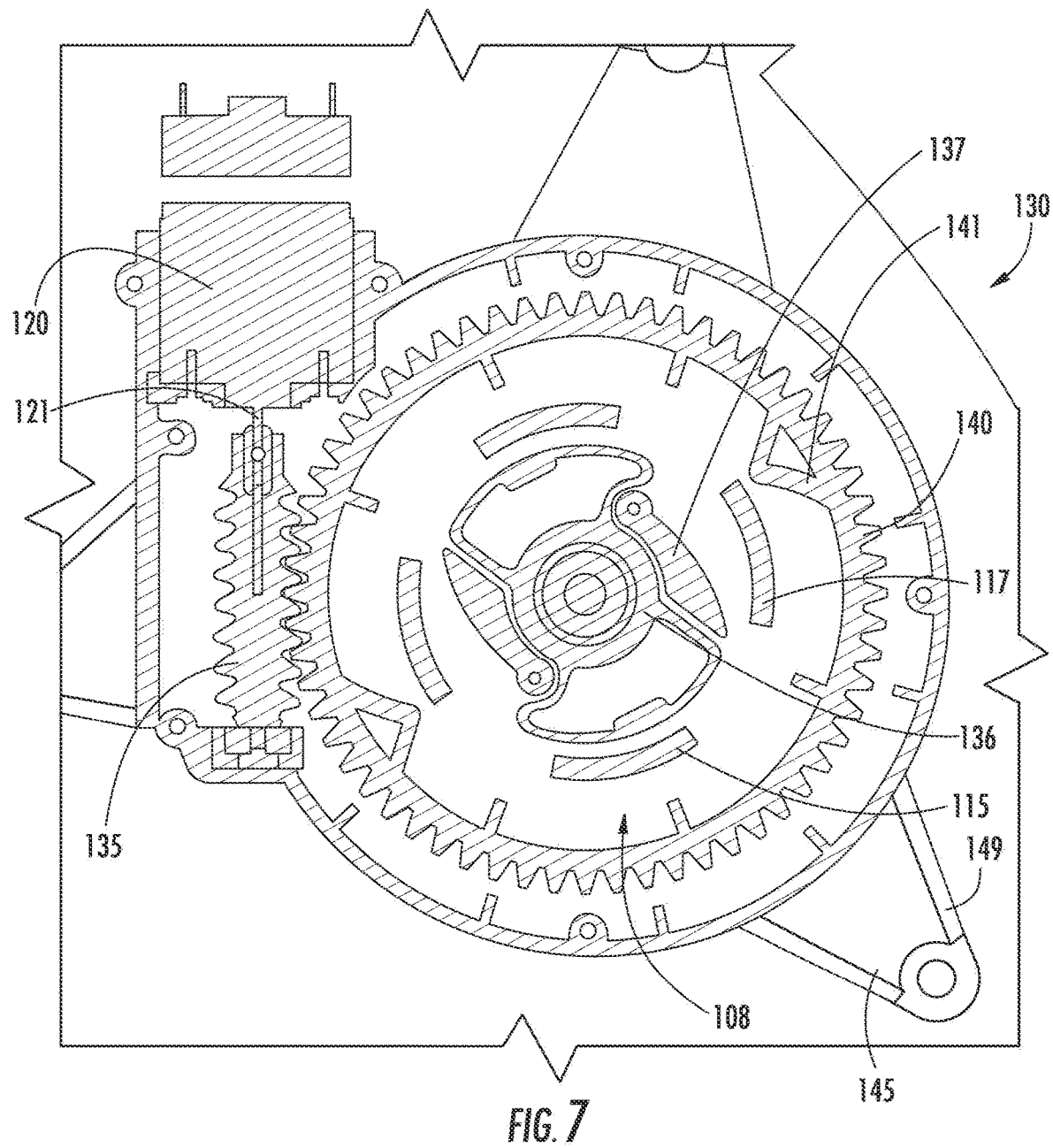
FIG. 7 is a section view of the engine of FIG. 4.

When cranking (e.g., a starting operation) is initiated by the user, the clutch 108 is engaged so that the worm gear 140 drives the crankshaft 104. Once the engine 100 has started, the clutch 108 disengages when the crankshaft 104 begins to rotate faster than the worm gear 140 (an overspeed condition), allowing the worm gear 140 to rotate independently of the crankshaft 104. In some embodiments, as illustrated in FIGS. 3 and 7, the clutch 108 includes a pulley 136 and two dogs 137 movable relative to the pulley 136 between an extended or engaged position (shown in FIG. 2) and a retracted or disengaged position (shown in FIG. 7). The pulley 136 is coupled to and rotates with the worm gear 140.

When activated in a response to a user input, the electric starting system 110 rotates the crankshaft 104 to rotate (e.g., crank) the engine 100. The electric motor 120 rotates the worm 135. The worm 135 is coupled to the worm gear 140 and rotates the worm gear 140. The clutch 108 is engaged so the dogs 137 extend outward (e.g., fly out) from the crankshaft axis 106. The dogs 137 engage with the flywheel 112 via the flywheel protrusions 117 and rotate the crankshaft 104 to rotate (e.g., crank) the engine 100. The worm gear 140 includes one or more protrusions 141 (e.g., one for each dog 137) configured to limit the range of travel of the dogs 137 upon cranking of the engine 100. When the crankshaft 104 begins to rotate faster than the worm gear 140 (an overspeed condition), the dogs 137 are retracted by contact with (e.g., pushed inward toward a retracted position by) the flywheel protrusions 117. Accordingly, the worm gear 140 is then allowed to rotate independently from the crankshaft 104. The electric motor 120 is turned off and rotation of the worm 135 and the worm gear 140 stops. The electric motor 120 may be turned off automatically in response to the engine reaching a threshold speed (e.g., as determined by monitoring the ignition system or spark plug), in response to the user removing the start input (e.g., stops turning the key switch or pushing the start button), after a set period of cranking time (e.g., 5 seconds), etc. Accordingly, an engine speed sensor and/or timer may be included. The engine speed sensor determines the engine speed based off of signals from the crankshaft position, ignition system, etc. The timer (e.g., timing circuit) monitors the lapsed time from the start of engine cranking. In response to these signals, the electric motor 120 may be turned off automatically.

The worm 135 and the worm gear 140 are configured to rotate the crankshaft 104 at a lower speed than the rotational speed of the electric motor 120 and thereby produce higher torque at the crankshaft 104 than at the electric motor 120. Compared to conventional starter motors mounted to the engine block, this permits the use of a higher-speed, lighter, and more compact electric motor 120, while still producing sufficient torque at the crankshaft 104 to rotate (e.g., crank) the engine 100. For example, the electric motor 120 may be a high speed motor rated for operation at 12,000 revolutions per minute (rpm) and the worm 135 and worm gear 140 reduce that rotational speed by a gear reduction ratio of 30:1 comparing the rotational speed of the electric motor 120 to the rotational speed of the crankshaft 104, with a resulting rotational speed of the crankshaft 104 of approximately 400 rpm. As another example, the gear reduction ratio may be 45:1, with a resulting gear speed of approximately 267 rpm. In some embodiments, the gear reduction ratio is between 30:1 and 50:1.

The engine 100 may also include a charging system to charge the battery 155. In some embodiments, the charging system includes an alternator to produce electricity. The alternator may be driven directly or indirectly (e.g., by a transmission, belt, chain, etc.) by the crankshaft 104. In other embodiments, other types of charging systems may be used. For example, an ignition coil waste spark charging system may be used in which waste sparks from the ignition coil are harvested to provide charging energy. In some embodiments excess energy from the ignition system is harvested to charge the battery 155. In a magneto or spark ignition system extra energy in the form of ignition sparks or pulses can be harvested and stored in the battery 155. Though a spark based ignition system is discussed as an example other types of ignition systems are possible. The excess energy of the ignition system may also be sufficient to power the controller or other electrical components included in the engine. After the engine 100 is started, there is a relatively abundant amount of excess energy that can be harvested as electricity. For example, the energy from the two positive pulses or sparks of a four-cycle magneto ignition system can yield about one amp of current. Other types of ignition systems also provide waste energy that could be harvested to power an electronic governor system. In a four-cycle magneto ignition system there is a waste spark on the exhaust stroke of the cylinder. In such a system, the two positive pulses or sparks and the waste negative pulse or spark could all be harvested. As another example, a charge coil for a capacitor discharge ignition (CDI) system can be used as a charging system for the battery 155.

Figure 8:
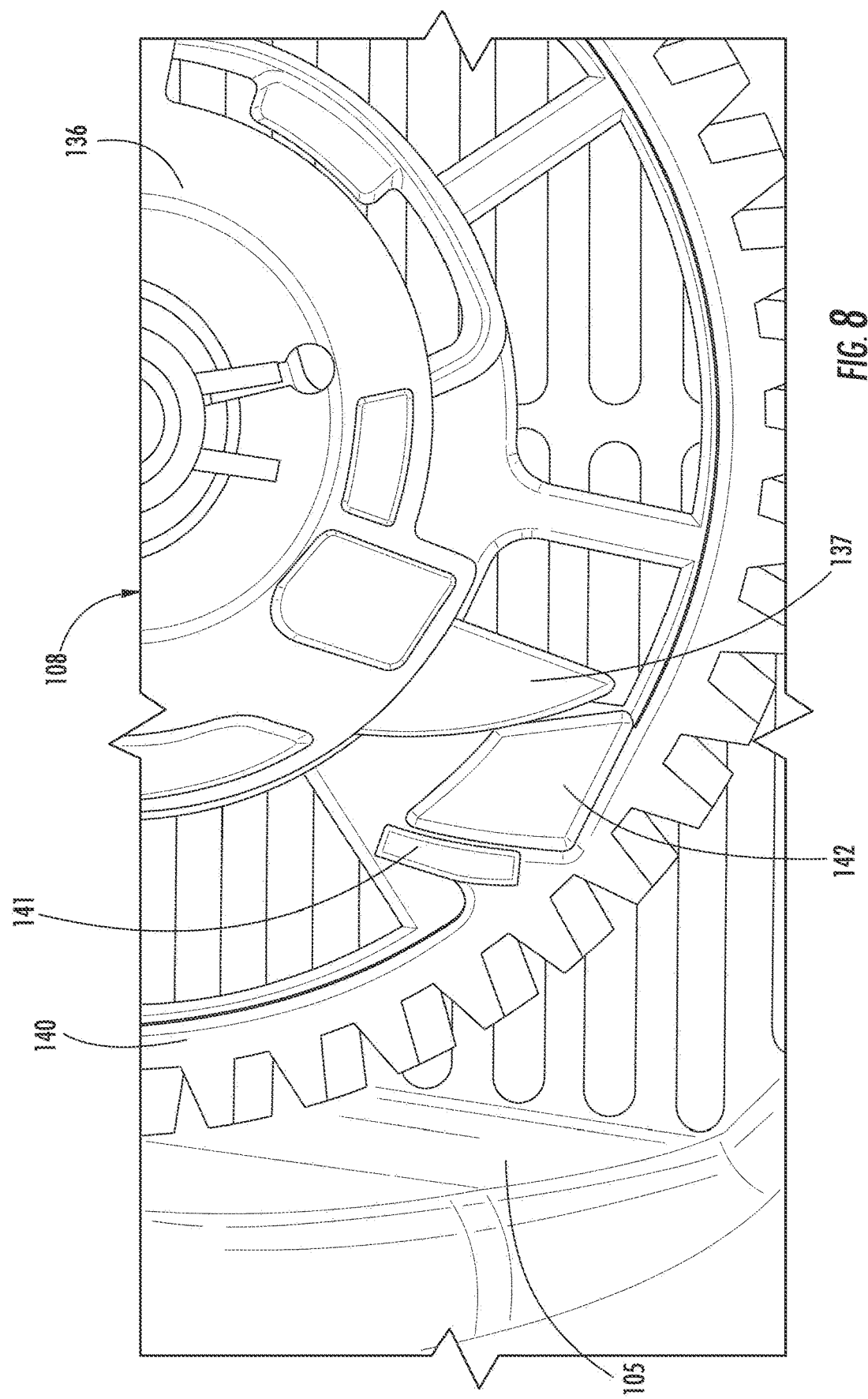
FIG. 8 is a perspective view of a portion of the engine of FIG. 1, according to an exemplary embodiment.

FIG. 8 illustrates a portion of electric starting system 110 according to an exemplary embodiment. In this embodiment, the worm gear 140 includes a damper 142 that is positioned between the protrusion 141 of the worm gear 140 and the dog 137 of the clutch 108. The damper 142 is configured to soften the initial engagement of the dog 137 with the protrusion 141 of the worm gear 140. In some embodiments, the damper 138 is made of an elastomer or rubber suitable able to slightly deform to dampen the initial engagement. In some embodiments, the dogs 137 are made of an elastomer or rubber. Without the damper 142, there may be a significant impact between the dogs and the protrusions 141, causing a loud noise (e.g., a "thud" or "clunk") at initial engagement when the dogs 137 initially contact the protrusions 141 of the worm gear 140. This type of contact may result in wear or breakage of the worm gear 140, the clutch 108, and/or the worm 135. Though only one damper 142 is illustrated a second damper is similarly positioned between the protrusion and dog that are not shown. In some embodiments, more than two dampers may be included with the electric starting system 110.

In some embodiments, the electric starting system 110 further includes a controller 143 (FIG. 6) configured to control operation of the electric starting system 110. The controller 143 may be separate from or incorporated into a multi-purpose engine controller (e.g., an ECU). In some embodiments, the controller 143 includes hard-wired circuitry, but not a computer processing unit. In other embodiments, the controller 143 does include a processor. In some embodiments, the controller 143 is part of the battery 155 and is located within the battery housing. The controller 143 may be configured to control operation of the electric motor 120. For example, in addition to or in place of the dampers 142 described above, the controller 143 may control the electric motor 120 to perform a soft start in which the force applied during initial engagement of the dogs 137 and the protrusions is reduced by increasing the rotational speed of the electric motor 120 over time. When the electric motor 120 first begins to rotate it does so at a relatively slow speed so that a relatively small force is applied during initial engagement. The controller 143 gradually increases this relatively slow speed until the electric motor is operating at its full rated speed. In some embodiments, the controller 143 uses pulse width modulation (e.g., via an electronic control) to control the power supplied to the electric motor 120 and thereby vary the rotational speed of the electric motor 120.

Figure 9:
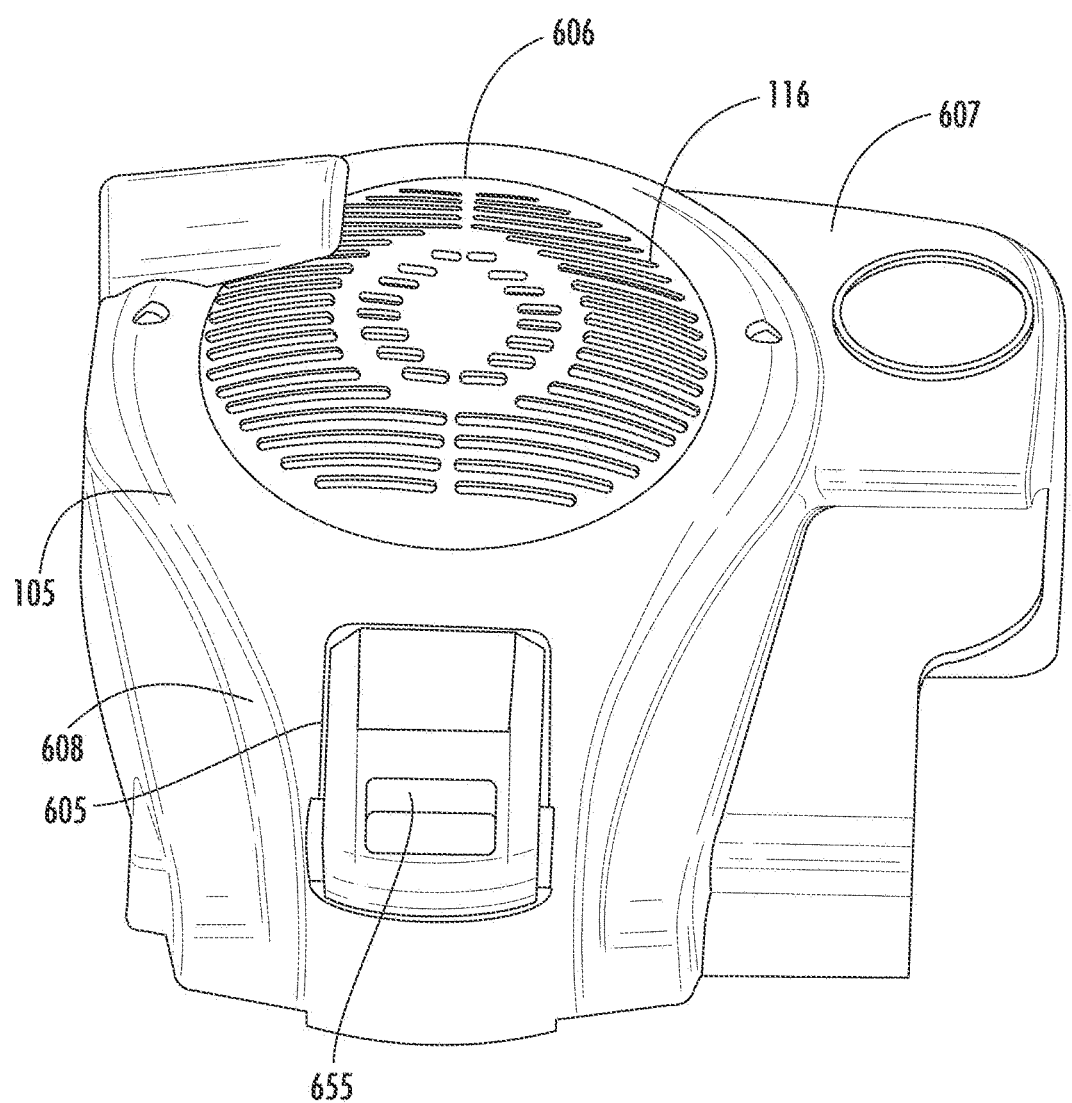
FIG. 9 is a perspective view of an internal combustion engine including an electric starting system, according to an exemplary embodiment.
Figure 10:
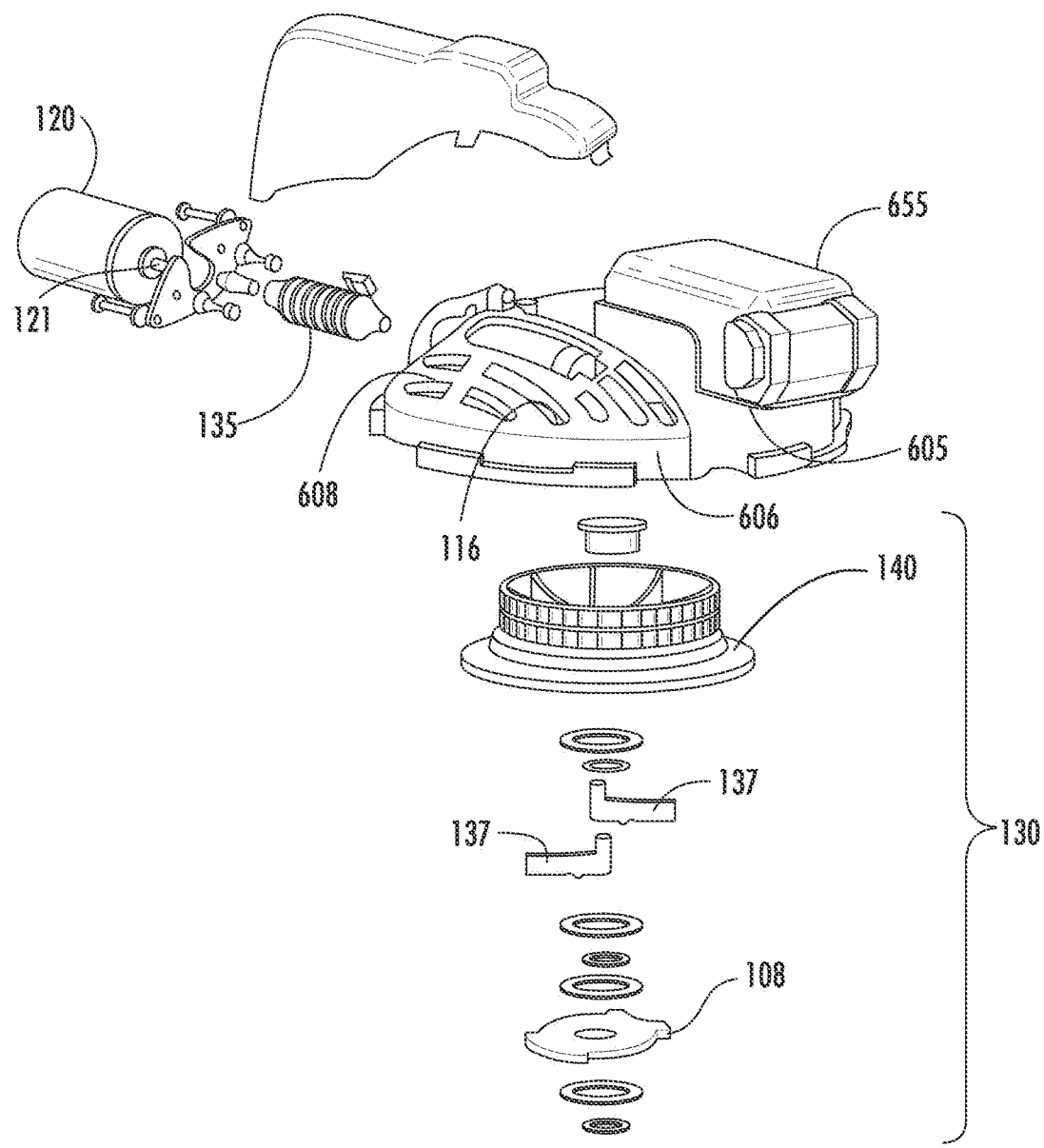
FIG. 10 is an exploded view of a several components of an internal combustion engine including an electric starting system, according to an exemplary embodiment.

Referring now to FIGS. 9-10, an engine 100 including an electric starting system 110 is illustrated according to exemplary embodiments in which the fixed battery 155 is replaced by a removable, rechargeable battery 655.

As illustrated in FIG. 9, the blower housing 105 includes a battery receiver 605 that is electrically coupled to the electric motor 120. The battery receiver 605 is configured to receive and secure the removable battery 655 to the blower housing 105 and to the engine 100. The blower housing 105 includes an air intake 606 that includes the air inlets 116 and a main body portion 607. As illustrated in FIG. 9, the battery receiver 605 is incorporated into the main body portion 607. As illustrated in FIG. 10, the battery receiver 605 is incorporated into the air intake 606. In embodiments where the battery receiver 605 is incorporated into the air intake 606, sufficient air passages are provided in the air intake 606 such that cooling air can freely enter the engine 100. The components shown in FIG. 10 take the place of manual starter recoil components. The configuration of the components allows for easy changeover from a manual starter recoil system to an electric starting system. For example, during changeover, the manual starter is removed and the electric starting system 110 is assembled without changing the blower housing, cylinder block, etc. In such a configuration, the worm 135, worm gear 140, air intake 606, clutch 608, electric motor 120, and battery 655 are part of a single assembly that is exchangeable with a manual recoil starter system. During the assembly process of the engine 100, the starter system, whether it is a manual recoil starter system or the electric starting system 110 described herein, is one of the last portions (or the last portion) of the engine 100 to be assembled. When assembling the electric starting system 110 to the engine 100, no components of the engine 100 need to be changed (e.g., tailored, adjusted), added, or removed to enable the use of the electric starting system 110 in place of a manual recoil starter.

In some embodiments, the battery 655 includes slots or grips for lifting and holding the battery 655. A locking mechanism, such as a hook or latch may snap into place when the battery 655 is inserted into the battery receiver 605 and hold the battery 655 in the battery receiver 605. Pinching the grips together may release the locking mechanism to allow removal of the battery 655 from the battery receiver 605. The removable battery 655 may be charged at a charging station or may include a charging port integrated with the battery 155 (e.g., battery pack with charging port to receive a connection from a wire coupled to an outlet or the charging station). The battery 655, in other embodiments, may alternatively plug directly into a wall outlet, or the charging station may be wall mounted or plug directly into a wall outlet. Removable batteries, battery receivers, charging stations, and other features for providing electrical power to an electric motor and details related to internal combustion engines and electric starting systems are described in commonly owned U.S. Pat. No. 9,127,658, which is incorporated herein by reference in its entirety.

The construction and arrangements of the starter system for an engine, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An internal combustion engine, comprising:
   an engine block;
   an outer housing positioned above the engine block;
   a crankshaft configured to rotate about a crankshaft axis; and
   an electric starting system, comprising:
   an electric motor; and
   an energy storage device located between the outer housing and a mount plate and fastened to the mount plate, wherein the energy storage device is electrically coupled to the electric motor to power the electric motor;
   wherein when the electric starting system is configured to rotate the crankshaft to start the engine when the electric starting system is activated.

2. The internal combustion engine of claim 1, wherein the electric motor is secured to an underside of the outer housing.

3. The internal combustion engine of claim 1, further comprising:
   a mounting frame;
   wherein the electric motor is coupled to the mounting frame;
   wherein the outer housing is configured to be interchangeable with a second outer housing.

4. The internal combustion engine of claim 1, further comprising:
   a controller configured to control the electric motor to start at an initial rotational speed and increase the rotational speed over time.

5. The internal combustion engine of claim 1, wherein the energy storage device is a rechargeable lithium-ion battery.

6. The internal combustion engine of claim 1, wherein the internal combustion engine further comprises a charging system configured to charge the energy storage device.

7. The internal combustion engine of claim 6, wherein the charging system comprises an alternator configured to produce electricity.

8. The internal combustion engine of claim 6, wherein the charging system is configured to produce electricity by receiving waste electricity.

9. The internal combustion engine of claim 1, wherein the electric motor is configured to turn off automatically in response to the engine reaching a threshold speed.

10. The internal combustion engine of claim 1, wherein the electric motor is configured to turn off automatically in response to a user removing a start input.

11. The internal combustion engine of claim 1, wherein the electric motor is configured to turn off automatically after a set period of cranking time.

12. The internal combustion engine of claim 1, wherein the energy storage device is positioned entirely within the outer housing.

13. Outdoor power equipment comprising:
    an internal combustion engine comprising:
    an engine block;
    an outer housing;
    a crankshaft configured to rotate about a crankshaft axis;
    an electric starting system, comprising:
    an electric motor; and
    a battery located between the outer housing and a mount plate and fastened to the mount plate, wherein the battery is electrically coupled to the electric motor to power the electric motor and positioned above the crankshaft; and
    wherein when the electric starting system is activated, the electric starting system rotates the crankshaft to rotate the engine for starting.

14. The outdoor power equipment of claim 13, wherein the electric motor is secured to an underside of the outer housing.

15. The outdoor power equipment of claim 13, further comprising:

a mounting frame;

wherein the electric motor is coupled to the mounting frame;

wherein the outer housing is configured to be interchangeable with a second outer housing.

16. The outdoor power equipment of claim 13, wherein the battery is a rechargeable lithium-ion battery.

17. The outdoor power equipment of claim 13, wherein the battery is positioned entirely within the outer housing.

* * * * *